(No Model.)

S. N. STONE.
SPECTACLE FRAME.

No. 576,330. Patented Feb. 2, 1897.

Witnesses
James S. Smith.
R. Clinton Balinger

Inventor
Samuel N. Stone.
By Edwin Guthrie,
Attorney

UNITED STATES PATENT OFFICE.

SAMUEL N. STONE, OF ATTLEBOROUGH, MASSACHUSETTS.

SPECTACLE-FRAME.

SPECIFICATION forming part of Letters Patent No. 576,330, dated February 2, 1897.

Application filed April 17, 1896. Serial No. 587,897. (No model.)

*To all whom it may concern:*

Be it known that I, SAMUEL N. STONE, a citizen of the United States, residing at Attleborough, in the county of Bristol and State of Massachusetts, have invented certain new and useful Improvements in Spectacle-Frames; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to spectacle-frames, and has for its objects the provision of efficient means for taking up the wear of the temple without disturbing the original adjustment of the lenses in the frame and to enable the user while writing or reading to turn the lens-frames and bring their centers upon the lines of sight without moving the head.

Persons who are obliged to use spectacles constantly find it very trying to the eyes to be compelled to wear their glasses always in the same position. For instance, a bookkeeper in looking downward upon his work must bow his head in order to look through the center of his lenses, and the attitude of the head is necessarily the same, within narrow limits, continually. He may employ two pairs of glasses, one pair straight and the other at an angle, as is sometimes done, but the resulting inconvenience is obvious. By the use of my invention the wearer is enabled to hold his head and neck in any comfortable position, while the lenses are readily adjusted to suit the position and to change the adjustment from time to time to suit variant conditions.

Each constituent element of my invention is described in detail and its office, together with the mode of operation of the whole, fully explained hereinafter.

Figure 1:
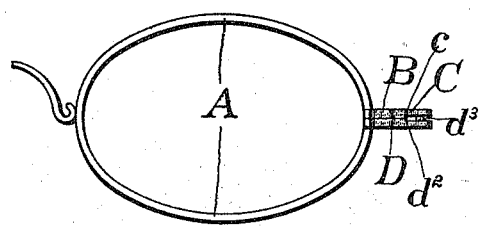
Figure 2:
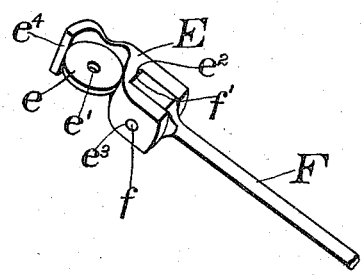
Figure 3:
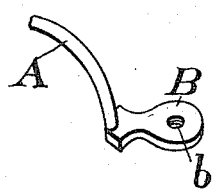
Figure 4:
Figure 5:
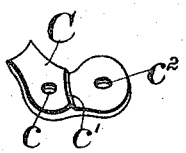
Figure 6:
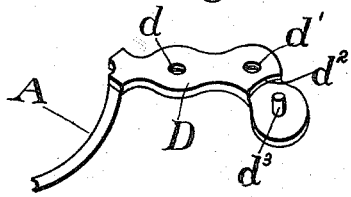
Figure 7:
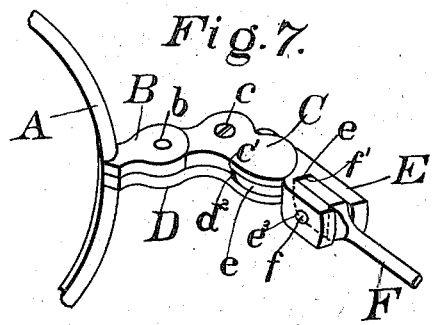
Figure 8:
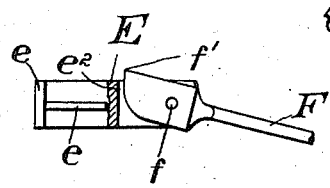

Referring to the accompanying drawings, wherein like letters are used to designate like parts in the several views, Figure 1 represents a side view of one side of a spectacle-frame, showing the joint, the temple wire and block to which it is pivoted being omitted. For purposes of increasing the lucidity of this description the remaining views are enlarged beyond the actual size of the parts as ordinarily constructed and beyond the scale adopted for the first figure. Fig. 2 represents a perspective view of a portion of the temple and the block to which it is pivoted. Fig. 3 represents a perspective view of the upper joint-block, showing a portion of the lens-frame attached. Fig. 4 represents a perspective view from above of an auxiliary upper joint-block. Fig. 5 represents a perspective view of the auxiliary upper joint-block from below. Fig. 6 represents a perspective view of the lower joint-block, taken from a point above it, with a portion of the frame attached; and Fig. 7 represents a perspective of the parts assembled. Fig. 8 represents a side view, partly sectional, of a portion of the temple and block to which it is pivoted, showing the construction designed to limit the movement of the temple.

Considering Fig. 1, A designates a portion of a frame of a pair of spectacles within which one of the lenses is to be fixed. Best shown in Fig. 3 is the upper joint-block B, attached to one of the free ends of the frame A. Near its outer end the block is provided with an orifice $b$, which is usually threaded. The auxiliary upper joint-block C is best presented in Figs. 4 and 5. Generally it consists of two portions, a relatively thicker portion possessing an orifice $c$, customarily threaded, and a relatively thinner portion, usually in the form of a disk, within which is centrally located the depression $c^2$. Between the two portions is seen the shoulder $c'$, to be mentioned again herein.

The lower joint-block D (see Fig. 6) is in one piece. It may be regarded as comprising a relatively thicker inner and intermediate portion and an outer extremity relatively thinner and having the form of a disk corresponding in size and shape to the disk of the auxiliary upper joint-block C, already described. Block D is pierced by threaded orifices $d\ d'$ through its inner and intermediate portions, and is provided with a pintle $d^3$, projecting centrally from its disk portion. Between the thicker and thinner portions is shown the shoulder $d^2$, which corresponds in form and extent with shoulder $c'$ of block C. The pintle $d^3$ is constructed to enter the depression $c^2$, already pointed out. The side view (see Fig. 1) shows the position of the three joint-blocks and of the pintle when assembled. Screws of ordinary pattern are employed to clamp the joint-blocks together, and it is my custom to countersink one of each pair of corresponding orifices in the upper and lower blocks in order that the head of each screw may be taken up flush with the surface of the part. In practice the heads of the two screws joining the blocks are found upon opposite sides of the completed joint.

Considering Fig. 2, E designates a block which embodies several distinctive features. In a curving recess near one end there is formed, usually integral with the block, a disk $e$, having a smooth orifice $e'$ extending centrally through the disk. The disk $e$ is fixed transversely within the curving recess in block E, dividing the recess into two equal recesses. At the remaining end of block E is shown a rectangular recess $e^2$ and one of two orifices $e^3$. The orifice $e^3$ (shown and marked) is countersunk for the reception of a pivot-screw, to be hereinafter described.

$e^4$ designates one face of the block E beyond the curving recess, which acts as a stop to limit the movement of the block in one direction. In Fig. 2 there is also shown the temple-wire F, having a flattened extremity which is pierced for the passage of pivot-screw $f$, the screw being designed to engage the orifices $e^3$ and to furnish a pivot for the temple. One edge $f'$ of the flattened portion of the temple is arranged to be brought into contact with the bottom of recess $e^2$ and to limit the upward movement of the block, or, more properly, of the lens-frame, the top of which may be inclined outwardly but not inwardly. (See Figs. 7 and 8.)

In assembling the parts of my invention the following method may be pursued, assuming the temple F to have been pivoted to block E, as described, and as shown in Fig. 2.

Let the pintle $d^3$ be passed through orifice $e'$ in disk $e$, when it will be immediately noticed that the outer end of the temple while capable of being moved inwardly cannot be moved outwardly beyond a line substantially perpendicular to the plane of the lenses. Now let block B be screwed upon block D and auxiliary block C so placed that the pintle will enter depression $c^2$ and each fastened by its screw, bringing the three disks together.

It will be readily observed that the top of the lens-frame cannot be moved inwardly, owing to the contact between edge $f'$ and the bottom of recess $e^2$. It is equally clear that if the top of the lens-frame be turned outwardly the eyes may be cast upon objects at lower points without movement of the head and through the optical centers of the lenses. As the movable parts become worn the screws may be tightened and the required amount of friction for convenient adjustment always created upon moving the parts.

I am aware that spectacle-frames have been constructed wherein the temple may be moved and is limited in its movement, but I am not aware that there has been made a joint for spectacle-frames possessing the special combination of coöperating elements shown and described by me herein.

What I claim, and desire to protect by Letters Patent of the United States, is—

1. A spectacle-frame having in combination with the lens-frames, an upper joint-block, an auxiliary upper joint-block, a lower joint-block constructed to correspond in extent and contour with the combined extent and contour of said upper joint-blocks, said auxiliary joint-block being separate from said upper and lower joint-blocks, said lower joint-block provided with a pintle near its outer extremity, said auxiliary joint-block having a depression adapted to admit said pintle, said auxiliary joint-block and said lower joint-block possessing relatively thicker and thinner portions, and each joint-block provided with suitable orifices for the reception of binding-screws, substantially as described.

2. A spectacle-frame having in combination with the lens-frames, an upper joint-block, an auxiliary upper joint-block, a lower joint-block constructed to correspond in extent and contour with the combined extent and contour of said upper joint-blocks, said auxiliary joint-block being separate from said upper and lower joint-blocks, said lower joint-block provided with a pintle near its outer extremity, said auxiliary joint-block having a depression adapted to admit said pintle, said auxiliary joint-block and said lower joint-block possessing relatively thicker and thinner portions, each joint-block provided with suitable orifices for the reception of binding-screws, a temple-carrying block having recesses, a disk portion and orifices, and a temple-wire adapted for pivotal connection with said block, substantially as described.

3. A spectacle-frame having in combination with the lens-frames, an upper joint-block, an auxiliary upper joint-block, a lower joint-block constructed to correspond in extent and contour with the combined extent and contour of said upper joint-blocks, said auxiliary joint-block being separate from said upper and lower joint-blocks, said lower joint-block provided with a pintle near its outer extremity, said auxiliary joint-block having a depression adapted to admit said pintle, said auxiliary joint-block and said lower joint-block possessing relatively thicker and thinner portions, each joint-block provided with suitable orifices for the reception of binding-screws, a temple-carrying block having recesses, a disk portion and orifices, means for limiting the movement of said block with relation to said joint-blocks, a temple-wire adapted for pivotal connection with said block, and means for limiting the movement of said block with relation to said temple-wire, substantially as described.

In testimony whereof I affix my signature in presence of two witnesses.

SAMUEL N. STONE.

Witnesses:
W. B. ALLEN,
F. N. ROBBINS.